United States Patent [19]

Randolph

[11] 4,310,284

[45] Jan. 12, 1982

[54] AUTOMATICALLY CONTROLLED WIND PROPELLER AND TOWER SHADOW ELIMINATOR

[76] Inventor: Arthur J. Randolph, P.O. Box 1541, Santa Rosa, Calif. 95405

[21] Appl. No.: 69,800

[22] Filed: Aug. 27, 1979

[51] Int. Cl.³ .............................................. F03D 7/04
[52] U.S. Cl. ................................. 416/132 B; 416/11; 416/41; 416/133
[58] Field of Search ............... 416/132 B, 133, 135 A, 416/139 A, 9, 41, 43, 11

[56] References Cited

U.S. PATENT DOCUMENTS

| 2,094,941 | 10/1937 | Burkhartsmeier | 416/11 X |
|---|---|---|---|
| 2,516,576 | 7/1950 | Jacobs | 416/132 B |
| 4,066,911 | 1/1978 | Sarchet | 416/132 B X |
| 4,183,715 | 1/1980 | Ducker | 416/141 X |

FOREIGN PATENT DOCUMENTS

| 791525 | 12/1935 | France | 416/137 |
|---|---|---|---|
| 868278 | 12/1941 | France | 416/137 |
| 988883 | 9/1951 | France | 416/132 B |
| 2300233 | 10/1976 | France | 416/41 |
| 461094 | 1/1951 | Italy | 416/137 |
| 5087 | of 1893 | United Kingdom | 416/41 |

Primary Examiner—Everette A. Powell, Jr.
Attorney, Agent, or Firm—Alvin E. Hendricson

[57] ABSTRACT

A propeller hub carries pivotally-mounted blades that are linked to a spring-loaded collar on the propeller shaft for automatic coning and feathering under predetermined high velocity movement along the propeller shaft to change the blade pitch angle during low wind velocity conditions. An airfoil support mounts a propeller shaft and turns therewith to reduce tower shadow effects. This is called a "down-wind system" meaning the propeller is behind the tower and causes the assembly to rotate into the wind without a tail vane.

5 Claims, 5 Drawing Figures

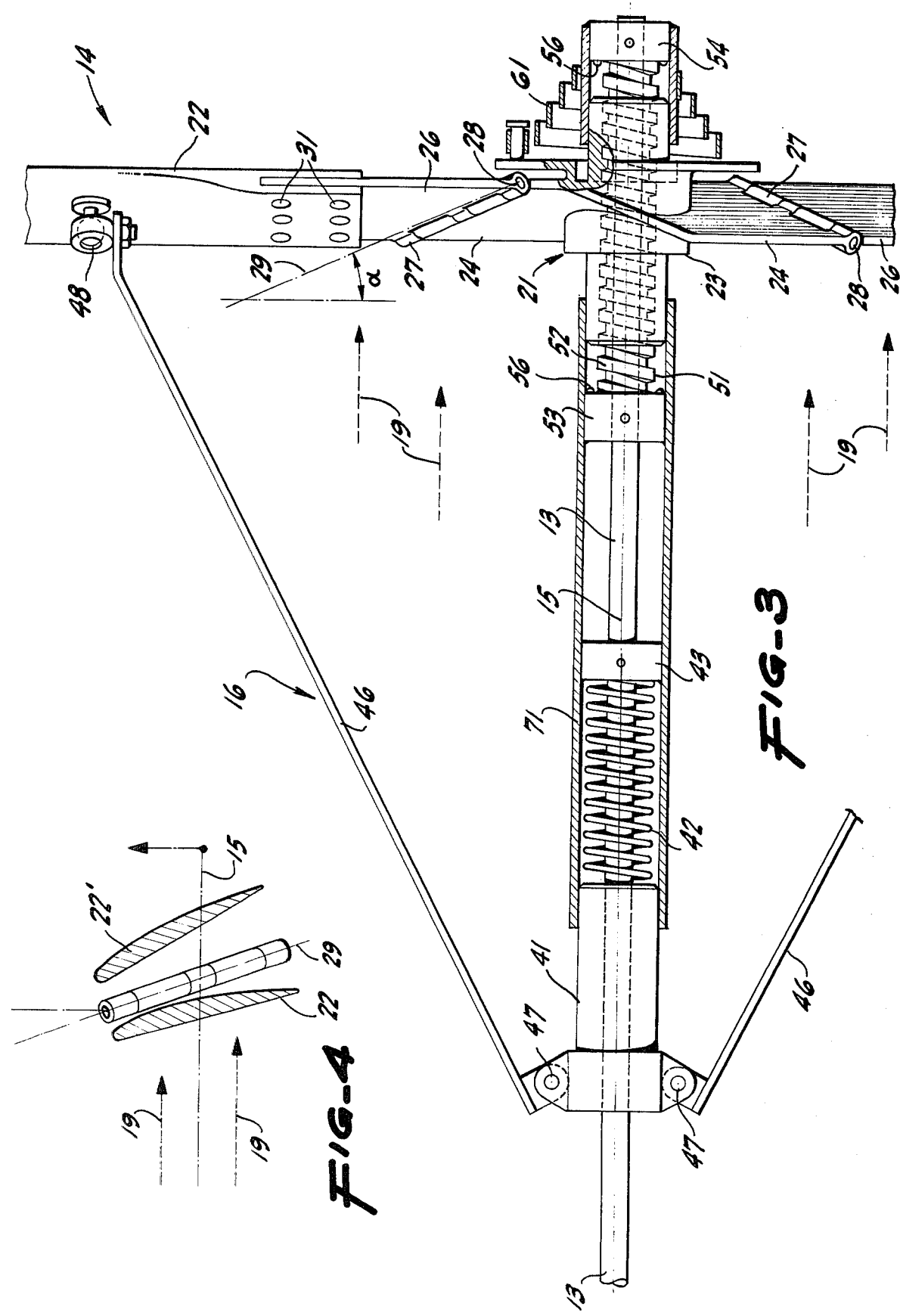

AUTOMATICALLY CONTROLLED WIND PROPELLER AND TOWER SHADOW ELIMINATOR

BACKGROUND OF INVENTION

Wind power has been harnessed by windmills for hundreds of years and commonly this has been accomplished by large windmill blades slowly turning a shaft from the force of the wind to pump water or rotate machinery. Modern attempts to utilize the force of wind to generate electrical power has suffered from the problems of widely varying wind velocity. Unfortunately, it is not normally possible to control wind velocity which is known to vary from zero to one hundred and more miles per hour.

A wind driven propeller designed to operate efficiently at some intermediate wind velocity such as 20-30 miles per hour will be rotated at such a high speed by winds of say 100 m.p.h. as to be self destructive. Additionally, such a propeller will operate at a very low efficiency at low wind velocities, such as 10 m.p.h. so as to be impracticable for power generation at low wind velocities. The foregoing limitations pose very real practical difficulties inasmuch as most windy geographical locations do experience quite large variations in wind velocities.

It is also known that a tower or the like upon which a wind driven propeller is mounted creates a "shadow effect" by changing the wind pattern on each blade as it aligns with the tower during propeller rotation. This creates an unbalance which is of small importance with slow moving propellers, however, with high speed propellers this unbalance causes vibrations that are damaging to bearings, the tower, and the like, mounting the propeller.

SUMMARY

The present invention comprises a wind propeller system adapted to rotate the shaft of an electrical generator, for example, by the force of wind upon propeller blades mounted on a hub on the shaft. Each of the blades are pivotally mounted on the hub on an axis inclined with regard to the shaft axis and are pivotally linked to a spring-loaded collar on the shaft. The degree of spring loading is predetermined so that wind force above a predetermined value will commence to overcome the spring pressure to pivot the blades on their inclined pivot axes so that the pitch angle of the blades are reduced and the blades are "coned", i.e. are tilted out of normal relationship to the shaft axis. Both of the foregoing automatic adjustments reduce the driving force of the wind on the propeller blades so as to govern the blade velocity and consequently protect the propeller from overspeeding. The greater wind velocity the more the automatic blade adjustment, as described above, and thus the present invention automatically limits propeller blade velocity so as to protect the system from destructive tip velocities. The strength of conventional materials and structures has practical limitations and it is quite possible in wind driven propeller systems for high velocity winds to drive the propeller at a speed which produces destructive stress resulting in structural failure of blades and connections. The system of the present invention automatically limits propeller blade speed so as to preclude physical failure from overspeeding.

The present invention also provides for materially increasing the efficiency of wind energy conversion at low wind velocities without decreasing efficiency at normal or designed wind velocities. It is recognized that a particular propeller blade pitch (or pitch range) is most efficient for a particular wind velocity and commonly a wind propeller is designed for some average or "normal" wind velocity so that the pitch of the blades is correct for maximum energy conversion at average expected wind velocity, but this then causes the propeller to be only inefficiently driven at quite low wind velocity. The present invention includes an automatic feathering feature which increases the blade pitch angle at low wind velocities, so that the propeller system is also capable of producing useful power under low wind speed conditions. This low speed capability is herein achieved by mounting the propeller hub for limited movement longitudinally of the mounting shaft, i.e. the propeller and generator shaft, and spring loading the hub to urge same into a position wherein the blade links to the shaft collar cause the blades to be slightly feathered wherein the pitch angle is increased for more torque. The generator on the common propeller-generator shaft loads the shaft only after the shaft reaches some predetermined rotational velocity so that the generator is generating and when the generator adds a sufficient load to the shaft the propeller hub then moves against the spring loading thereof to a displaced or normal longitudinal position on the shaft wherein the propeller blades are pivoted into a reduced pitch angle appropriate for operation of the system at "normal" wind velocity.

The automatic low speed feathering of the present invention may be implemented by mounting of the propeller hub on a fast lead thread on the propeller shaft between a pair of longitudinally-spaced stops with a helical spring connected between the hub and the shaft, as at one of the stops. At rest, the helical spring is partially unwound to move the hub toward the otherwise provided shaft collar linked to the blades so that the blades are feathered, i.e. turned to a larger than normal pitch angle. The blade pitch angle at rest may be as much as 30° although 10°-15° is usually sufficient. At 30° pitch angle, the ratio of wind velocity to blade tip is about 2:1. The propeller system in this condition will cause the propeller to rotate as noted above, at a wind velocity in the range 7-10 m.p.h. for example. When the propeller shaft is loaded by the generator, the helical spring is forced to wind up as the hub moves along the fast thread to the opposite stop on the shaft. This pivots the blades back to "normal" pitch, i.e. a smaller pitch angle for efficient operation at "design" wind velocity.

In accordance with the present invention, a propeller shaft is mounted centrally of a vertical pivotally mounted support having an airfoil configuration in cross section for influencing each of a pair of propeller blades equally as they pass through vertical. This structure substantially eliminates tower shadow to thus minimize unbalanced forces that otherwise cause excessive vibration.

DESCRIPTION OF FIGURES

The present invention is illustrated as to a single embodiment thereof in the accompanying drawing wherein:

FIG. 1-A is a transverse sectional view through the propeller shaft mounting structure;

FIG. 3 is a central vertical sectional view of the automatic control system of the present invention taken in the plane 3—3 of FIG. 2; and FIG. 4 is a schematic representation of a blade in normal and pivoted position of increased pitch angle.

DESCRIPTION OF PREFERRED EMBODIMENT

Figure 1:
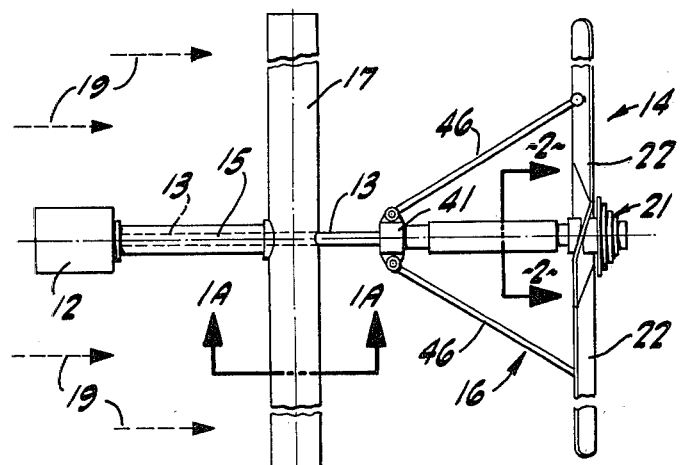
FIG. 1 is a side elevational view of a windmill which may incorporate the present invention and including the tower shadow eliminator hereof.
Figure 1A:
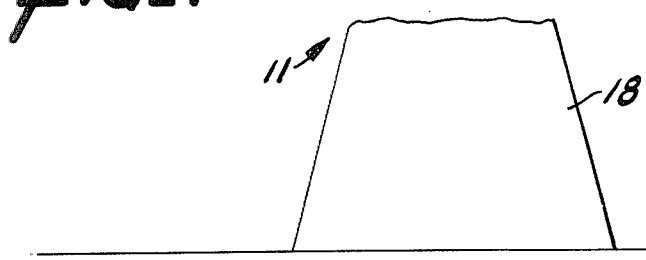

The system of the present invention is adapted to be employed with any type of wind propeller or windmill, however, it is particularly directed to wind-powered electrical generating systems. Commonly, such a system is mounted atop a tower 11 and is shown to include a generator 12 mounted at a forward end of a propeller shaft 13, having a propeller 14 adjacent the opposite end and mounted by a control system 16 in accordance with the present invention. It is provided herein that the propeller shaft is rotatably mounted through an elongated support member 17, which, in turn, is pivotally mounted atop the tower at 18, and which has a length at least equal to the total distance between the tips of the propeller blades 14. The support member 17 has an airfoil configuration, as indicated in FIG. 1-A, in order to minimize turbulence in the passage of air thereover and the leading edge of the support member is directed toward the generator 12. It is noted that the propeller and generator mounting is arranged to have the generator directed into the wind, so that the propeller is consequently mounted behind the support member 17 with regard to wind direction, as indicated by the arrows 19 in FIG. 1. The physical construction of the support member may be varied at will, however, the external configuration is that of an airfoil, as indicated, in order to provide the least possible disturbance of wind passing thereover.

It will be seen that with the pivotally-mounted airfoil support member 17 carrying the propeller 14, both blades of a two-bladed propeller will be aligned with the support member every half revolution of the propeller. Consequently, each propeller blade will experience substantially identical conditions during each revolution of propeller and this then serves to minimize the application of unbalanced forces to the propeller shaft and propeller blade mounting. The present invention will thus be seen to substantially eliminate the "tower shadow" effect which otherwise does result in unbalanced forces being applied to propeller blades during rotation thereof in the wind. The particular mounting arrangement of FIG. 1 may thus be considered to incorporate a tower shadow eliminator wherein the "shadow effect" of the tower is balanced out, so that high speed propeller rotation is possible without introducing vibrations that may be harmful to mounting elements, such as bearings or the like.

The automatic control of the present invention is applicable to propellers having two, three or more blades although the above-described tower shadow eliminator is only applicable to a two-bladed propeller. Continuing with the illustrated example of two propeller blades 22, it will be seen that the hub 21 is formed with a central portion 23 which includes two arms 24 extending generally radially outwardly of the axis of the hub in diametrically opposed relationship with each of the arms 24 pivotally mounting an outer hub element 26 in extension outwardly therefrom. This pivotal mounting may comprise a hinge 27 having a hinge pin 28 along the axis thereof which is disposed at a slight angle $\alpha$ to a plane perpendicularly through the hub axis and is disposed at a substantial angle $\beta$ to a plane through the hub axis normal to the axis of the blade carried by the hub element mounted by such hinge. These angles are illustrated in FIGS. 2 and 3 of the drawings and are further discussed below.

Figure 2:
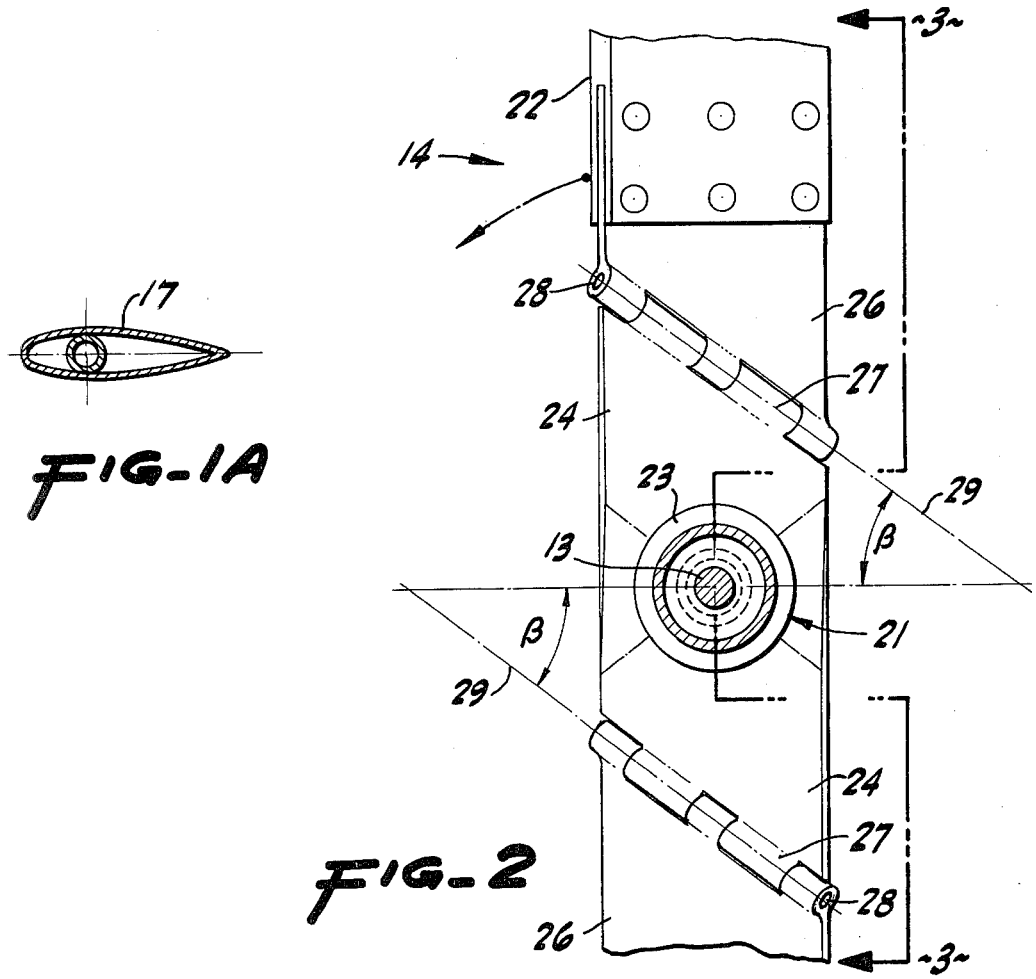
FIG. 2 is an end elevational view of a propeller hub in accordance with the present invention mounted upon a shaft as viewed in the plane 2—2 of FIG. 1.

As shown in FIGS. 2 and 3, each of the outer hub elements 26 are twisted in configuration from the inner or hinged surface to the outer edges thereof, and each of these elements mount a blade 22 in extension therefrom. The blade 22 may, for example, be riveted to the hub portion 26, as indicated at 31, and the twist or curvature in the outer hub portion 26 is designed to normally dispose the blade 22 approximately perpendicularly to the axis of the hub and in appropriate pitch for operation at designed wind velocity. The physical configuration of the individual blades may vary in accordance with design however normally they are formed as an airfoil surface as is known in the art.

The hub 21 is mounted upon the propeller shaft 13 in the manner to be described below, and in addition, the present invention provides a strut connection for each of the blades, as particularly illustrated in FIG. 3. A collar 41 is slidably disposed on the propeller shaft 13 for movement longitudinally thereof and a coil compression spring 42 is disposed between this collar 41 and a fixed stop 43 on the propeller shaft. The collar 41 is disposed ahead of the propeller 14 with regard to the direction of wind travel and the fixed stop 43 on the propeller shaft 13 is disposed between this slidable collar 41 and the propeller. A strut 46 is pivotally mounted at 47 on the slidable collar 41 and is connected by a ball joint 48 to the propeller blade 22. Similar strut connections are provided for each of the blades from the collar 41.

Should the wind force on the blades 22 become excessive, there will be a sufficient force applied to the strut 46 to move the collar 41 to the right in FIG. 3 by compressing the coil spring 42 against the fixed stop 43. This will then cause the blades to pivot about the hinge pins 28 of the hub 21. In this respect, reference is made to FIG. 4 of the drawings showing a propeller blade 22 having an appropriate airfoil surface, as illustrated, disposed in normal position for efficient operation at a predetermined wind velocity of say 30 m.p.h. As the wind velocity increases, the force on the propeller blade 22 is increased so as to progressively compress the spring 42 of FIG. 3 by sliding the collar 41 linked to the blade by the strut 46. This then allows the blade to pivot about the hinge pin 28 and thus the axis 29 thereof, which in FIG. 4 is seen to be disposed as the small angle $\alpha$ to the axis 15 of the propeller shaft 13. It will, however, be appreciated that the axis 29 is disposed at the substantial angle $\beta$ to the propeller shaft axis 15 in a plane perpendicular to FIG. 4, and thus pivoting of the blade about the axis 29 will move the blade into a position 22' wherein the pitch angle is materially changed and the angle in a plane perpendicular to the propeller shaft is changed a small amount. This small deflection from perpendicular is generally termed coning inasmuch as the blades move back to lie on the surface of a cone having the apex thereof directed into the wind. It will be appreciated that this variation of pitch angle materially reduces the propeller velocity at a given wind speed and also the coning of the blade reduces the force applied thereto by the wind. Consequently, it will be seen that increasing wind velocity automatically causes the blade pitch angle to change and the blades to cone so that the propeller speed is reduced. The degree of change of pitch angle and coning is controlled by the compression of the spring 42 which, of course, may be predetermined in accordance with the various parameters of any individual installation. In the foregoing manner, the present invention accommodates greatly increased wind velocities over that for which the propeller system is designed without any possibility of structural damage by high wind velocities.

The present invention may additionally incorporate means for producing useful power from a wind propeller at wind velocities well below that for which the propeller is designed. This is shown to be accomplished in accordance with a preferred embodiment of the present invention in FIG. 3 by mounting the hub 21 on a fast thread 51 for limited movement longitudinally of the propeller shaft 13. More specifically, the structure illustrated in FIG. 3 includes a threaded sleeve 52 secured on the shaft 13 and having external threads thereabout mating with internal threads on the hub 21 which is disposed upon the sleeve 52. The sleeve 52 is fixed to the propeller shaft 13 between a pair of stops 53 and 54 which are also fixed to the shaft. The hub 21 will thus be seen to be capable of movement between the stops 53 and 54 by rotation along the threaded sleeve 52. Projections 56 may be provided on the rear stop 54 and also the forward stop 53, if desired, in order to prevent any possible binding of the hub on the threads as the hub is moved against the stops. This portion of the present invention further includes resilient means urging the hub 21 toward the forward stop 53, i.e. into the wind which is indicated by the arrow 18 in FIG. 3. These resilient means may comprise a helical spring 61 mounted between the rear fixed stop 54 and the hub 21. This spring 61 urges the hub to the left in FIG. 3 to the position wherein the blades 22 of the propeller 14 may be tilted slightly into the wind and are pivoted into a feathered position to generate a greater torque at low wind velocity.

It will be appreciated that the automatic compensator of the present invention for low wind velocities is, in fact, integrated with the automatic feathering and coning of the present invention for high wind velocities, as described above, for the struts 46 operate in both of these modes. The stops 53 and 54 are located only a short distance apart so that the hub 21 is only moveable for a short distance between these stops. The system is designed to normally operate with the hub against the rear stop 54, and it is from this position that the present invention has been described as above with respect to the prevention of overspeeding of the propeller system. As the wind velocity dies down to a low velocity, the spring 61 will urge the hub to the left in FIG. 3, and this will be seen to cause the propeller blades to be pivoted about the hinge pins, so as to increase the pitch angle and consequently increase the torque applied to the blades by a wind of any particular velocity, by preventing the airfoil of the blades from going into "stall" at low wind speeds and thus loss of power at slow speeds. With no wind blowing, the hub 21 will be disposed in contact with the forward stop 53 so that the blades are rotated to pitch angles of 10°–15° or more, for example. With such a pitch angle even a low velocity wind will cause the propeller to rotate and drive the propeller shaft 13 through the spring 61. As the wind velocity increases, a greater force will be applied to this spring 61 until the force applied from the hub is sufficient to overcome the resilient force of the spring and the hub will be rotated along the thread mounting same until the hub reaches the rear stop 54. This will, of course, cause the propeller blades to be pivoted about the hinge pins thereof to reduce the pitch angle of the blades to about 5°, for example. It is noted that this reduction in pitch angle of the blades may also be accomplished by loading the generator to thereby apply resistance to the rotation of the propeller shaft so that the hub is moved to the right in FIG. 3.

While it is possible to design the hub mounting in a variety of ways, and also to resiliently load the hub mounting in more than one manner, there is illustrated an embodiment of the present invention wherein the threaded mounting provides about one and a half turns of the propeller from one stop 53 to the other stop 54. Additionally, it is noted that the use of a helical compression spring is quite suitable to load the hub for the limited movement required herein.

With regard to physical characteristics of the present invention, it is also noted that wind powered systems are commonly mounted in out-of-the-way locations wherein they must operate untended. Furthermore, such systems may well be subjected to wide variations in temperatures as well as wind velocities. Thus it is important in the present invention to guard against circumstances which might cause malfunctioning of an unattended system. One such circumstance to guard against is the possible freezing of moveable portions of the system as might occur, for example, by the formation of ice about the coil spring 42 or upon the threads mounting the hub. Protection from such a situation may be provided by a cover 71 disposed about the propeller shaft and elements mounted thereon, as illustrated in FIG. 3 with such a cover possibly being filled with a lubricant designed to withstand extreme temperature variations. Preferably, this cover 71 is designed to rotate with the propeller and hub and is preferably mounted on the hub itself, so as to rotate with the hub and move longitudinally of the propeller shaft with the hub.

The present invention has been described above with respect to a preferred embodiment, however, it will be apparent to those skilled in the art that numerous modifications and variations are possible within the spirit and scope of the invention and thus it is not intended to limit the invention to the precise terms of description or details of illustration.

What is claimed is:
1. A windmill propeller system comprising
a hub mounted upon a rotatable shaft and carrying a plurality of blades in extension outwardly therefrom for rotating said shaft by wind power,
a hinge mounting each of said blades on said hub with each hinge having a hinge axis inclined at a first acture angle to a plane perpendicularly through said shaft and at a second acute angle to an axis of the blade mounted by the hinge, and
means resiliently restraining said blades from pivoting about said hinge axes away from wind blowing on said blades and including a collar linked to said blades and slidably disposed on said shaft for movement between a first pair of fixed stops on said shaft, means resiliently urging said collar away from said hub, mounting means mounting said hub for limited movement longitudinally of said shaft and spring means resiliently urging said hub along said shaft into the wind for limited pivoting of said blades on said hinges.

2. The windmill system of claim 1 further defined by said mounting means comprising a threaded engagement of hub and shaft with a second pair of stops on said shaft at opposite ends of threads thereon, and said spring means including a helical spring mounted between said hub and one of the stops of said second pair of stops.

3. The system of claim 1 further defined by said second angle being of the order of 45°.

4. The system of claim 2 further defined by a cover mounted on said hub and disposed about said shaft and threaded engagement of hub and shaft.

5. A windmill propeller system comprising a hub mounted on a propeller shaft and carrying a plurality of windmill blades with a predetermined pitch in extension outwardly from said hub for rotating said shaft by wind power;

means pivotably mounting said shaft for directing same into the wind as a wind blows on said blades, hinges mounting said blades on said hub with each hinge having a hinge axis inclined with respect to a plane perpendicularly through said shaft centrally of the blade mounted by the hinge and also inclined with respect to a plane parallel to the shaft and normal to the axis of the blade mounted by the hinge, a collar slidably disposed on said shaft on the upwind side of said hub and moveable on said shaft between first and second locations thereon, means linking said collar to each of said blades for pivoting said blades about the respective hinge axis thereof, means resiliently urging said collar away from said hub to a first of said collar locations, whereby a sufficiently strong wind acting on said blades will pivot said blades about the hinge axes thereof against the force of said resilient means for feathering and coning said blades to reduce the wind force thereon, and means defining a thread about said shaft between first and second stops on said shaft with said hub being threaded thereon for limited movement longitudinally of said shaft, and a spring urging said hub along said shaft toward said collar for resiliently pivoting said blades about said hinge axes to increase the pitch angle of the blades at low wind velocities.

* * * * *